Dec. 14, 1943.     D. P. DYER, JR     2,336,930
VIBRATION MOTOR
Filed Aug. 2, 1940     2 Sheets-Sheet 1

Inventor:
DANIEL P. DYER, JR.,
by John E. Jackson
his Attorney.

Dec. 14, 1943.          D. P. DYER, JR          2,336,930
                        VIBRATION MOTOR
                     Filed Aug. 2, 1940          2 Sheets-Sheet 2

Inventor:
DANIEL P. DYER, JR.,
by: John E. Jackson
       his Attorney.

UNITED STATES PATENT OFFICE 2,336,930

VIBRATION MOTOR

Daniel P. Dyer, Jr., Chagrin Falls, Ohio, assignor to The American Steel and Wire Company of New Jersey, a corporation of New Jersey Application August 2, 1940, Serial No. 349,819

15 Claims. (Cl. 73—51)

This invention relates to an electrical vibration motor and, particularly, to improvements for controlling and varying the amplitude and frequency of vibration thereof.

While for many years the static physical properties, such as breaking strength, elongation, yield point, etc., of materials have received considerable study, it has been within recent years only that any appreciable attention has been applied to investigating the so-called dynamic properties of material, which have to do with the materials' resistance to fatigue failure, its damping capacity, impact strength, notch sensitivity, etc. By far, the majority of service failures of fabricated metal structures are the result of fluctuating stresses due to reciprocating or rotating parts, vibration, or shock, all of these being forces which call upon the dynamic properties of a material for resistance.

Although these dynamic properties of metals have been studied in their simplest forms, recent research has shown that such service failures as previously mentioned have more to do with the final fabricated form and shape of the metal structure than the elementary nature of the components themselves. In other words, while the fatigue properties of single metal wires are being studied on common rotating beam fatigue machines, a rope made from such wires may exhibit resistance to fatigue failure unpredictable from the known values found on its simple wire components. For example, simply changing a straight wire into a helical spring may alter the fatigue characteristics of the original wire. Reasons for this behavior of metals have to do with the fact that the dynamic properties of a material are tremendously influenced by the nature of the applied stresses, the residual surface stresses, the mechanical perfection of the metal surface, freedom from decarburization, etc., all of which are features having to do with the manner of fabricating the finished article. Consequently, in any proper approach to the problem of service failures due to dynamic causes, it is not alone sufficient to study the elementary metal going into the article to be used, but the final fabricated item itself must be investigated, and it is to improvements for an electrical vibration motor for testing in vibration fatigue all types of wire fabricated items such as rail bonds, stranded wires, cables, etc., to which the present invention relates.

Various types of electrical vibration motors have been suggested and used for such purpose, but these were generally unsatisfactory for the reason that such motors usually vibrated the wire or article being tested at one frequency, that is, the fundamental frequency or lowest resonant frequency. When vibration testing a strand or rope, for example, there are certain resonant or natural frequencies that occur, and the best vibration fatigue test of the same could not be obtained for each wire or article at the one frequency. It has been suggested that an electrical filter be incorporated with the vibration motor so that multiples of the fundamental frequency might be obtained, but it was found that such electrical filters could not be adjusted so as to control the frequencies within a close enough range as desired.

Accordingly, it is the general object of the invention to provide an improved electrical vibration motor having means arranged therewith whereby any desired frequency may be obtained within a range narrower than with any electrical vibration motor heretofore suggested or used.

It is another object of the invention to provide an improved means for adjusting the frequency of vibration transmitted by an electrical vibration motor which is simple and inexpensive in its construction, and at the same time, one which is efficient and effective in its use.

It is a further object of this invention to provide a means for magnifying the amplitude of vibration transmitted by an electrical vibration motor.

It is still another object of the invention to provide a simple and inexpensive means of protecting the drive coil and magnetic field of an electrical vibration motor.

Various other objects and advantages of this invention will be more apparent in the course of the following specification and will be particularly pointed out in the appended claims.

In the accompanying drawings there is shown, for the purpose of illustration, one embodiment which my invention may assume in practice.

Figure 1:
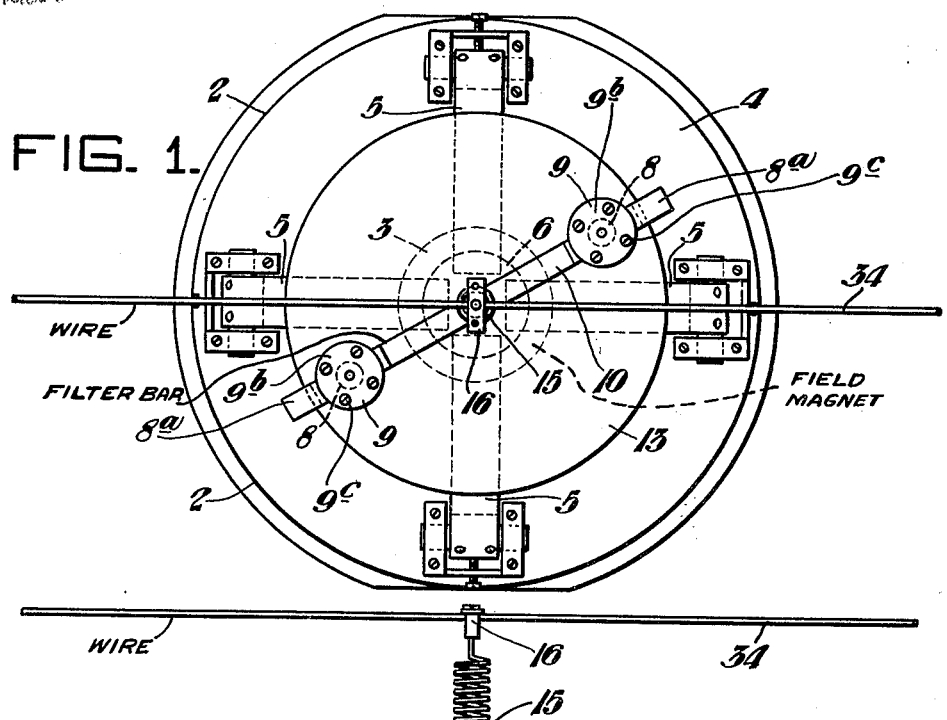
Figure 1 is a plan view of a vibration motor showing the improved adjusting means of my invention incorporated therewith.

Referring more particularly to the drawings, there is shown a conventional type electrical vibration motor 2, which consists of a drive coil 3 disposed in the magnetic field of a magnet 4. The drive coil 3 is suspended in the magnetic field, preferably by means of a plurality of leaf or cantilever springs 5, made preferably of beryllium copper, namely, four in the present instance, which are connected to the frame of the motor in any suitable manner. There is securely attached to the coil 3 on the top side thereof, a spider member 6 to which a drive rod 7 is attached.

Figure 2:
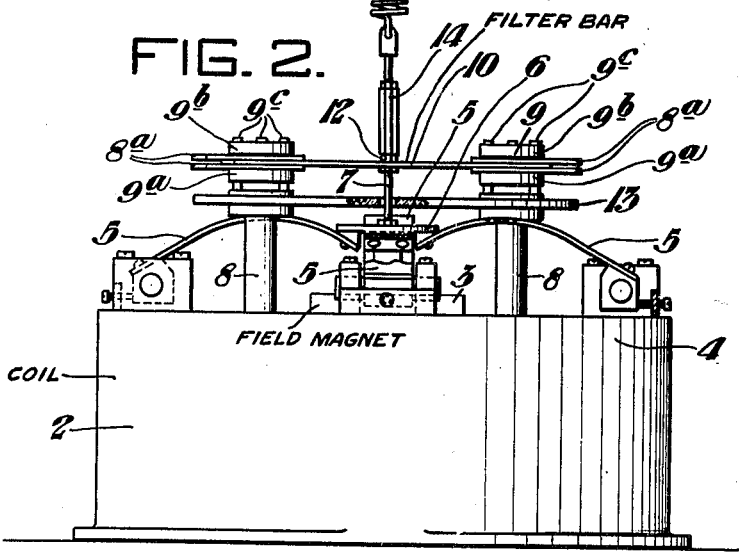
Figure 2 is an elevation thereof.

According to the present invention, as shown in Figures 1 and 2 of the drawings, there is arranged on the top of the motor 2, a pair of diametrically positioned post members 8 or other suitable supporting members, which preferably are rigidly attached to the frame of the motor. There is arranged on the top of each of the post members 8, bar clamping means 9 which is adapted to adjustably support a mechanical filter in the form of a flat metallic mechanical filter or exciter bar 10 of predetermined dimensions. The clamping means 9 consists of a circular plate-like member 9a arranged on the top of each of the post members 8, and a similar circular plate-like member 9b having cap screws 9c which are adapted to hold the same in engagement with plate-like member 9a and with which they are adapted to cooperate to adjustably hold the exciter bar 10 therebetween. The upper end of the drive rod 7 is attached to the exciter bar preferably centrally thereof betwen the posts 9 as at 12 in any suitable manner.

There is associated with each of the post members 8, a pair of shims 8a with one arranged below and the other arranged above the exciter bar 10 in the clamping means 9. It will be understood that the shims are adjusted in the clamping means between the plate-like members 9a and 9b, i. e., away from and toward the center of the exciter bar as desired, so that the distance between the points of support, which is the distance between the inner ends of the shims, can be adjusted in order to adjust and to obtain the desired frequency of vibration of the exciter bar 10. Thus, it will be seen that the pair of shims arranged with each post member are moved toward each other and the center of the exciter bar to obtain a higher frequency of vibration and away from each other and the center of the exciter bar to obtain a lower frequency of vibration, i. e., the distance between the points of effective support is shortened to increase the frequency and lengthened to decrease the frequency. It will also be understood that the thinner the exciter bar, the lower the frequency of vibration thereof, and that the thicker the exciter bar, the higher the frequency of vibration of the same will be.

There is also carried by the posts 8 between the exciter bar 10 and the drive coil 3, a disk-like member 13, preferably made from a non-metallic material such as fiber, ply-wood and the like, for protecting the drive coil and the magnetic field in which it is disposed from dust and other foreign elements. It will be understood that the drive rod 7 extends through an opening in the protective disk 13 substantially centrally thereof. There is arranged above the exciter bar 10, a connecting member 14 which is attached to the exciter bar 10 substantially centrally thereof and opposite the drive rod attachment thereto. There is also arranged above the exciter bar 10, a resilient driving means, preferably a coil spring 15, having the lower end thereof attached to the connecting member 14 with the upper end thereof connected to a connecting member 16 which is adapted to be attached to the wire or article to be tested, designated at 34 in the present instance, which is supported by means (not shown) in any suitable manner in accordance with the particular test being made.

It will be understood that an alternating current is passed through the drive coil 3 and the coil will move in the field of the direct current magnet 4 and develop a force which is applied to the drive rod. The spring suspension of the drive coil is such that the maximum amplitude of vibration is preferably three-eighths of an inch from the position of the coil at rest. The drive coil is coupled to the wire or article under test and the alternate attraction and repulsion of the coil causes the wire or article to vibrate. The coil spring drive 15 serves to magnify the amplitude of vibration of the drive coil 3 of the motor, that is, it permits the wire or article being tested to be vibrated at amplitudes much greater than the amplitude of movement of the drive coil. If the drive rod of the drive coil were connected directly to the wire or article being tested, the amplitude vibration of the wire or article would be the same as that of the drive coil, which is approximately one-half inch in a standard vibration motor, which of course, is not entirely satisfactory. In providing a coil spring drive, amplitudes of vibration of any degree may be obtained, depending upon the size of the coil drive spring. Also, by using such a spring drive the wire strands can be vibrated at the antinodes, i. e., at the points on the strand being vibrated where the points of maximum amplitude of vibration occur.

It will be understood that the exciter bar 10 acts as a mechanical filter and that it can be adjusted in the clamping means 9 arranged in the top of the posts 8 to any desired position, and the shims may be used, if desired, so that the exciter bar transmits only desired frequencies in the same manner that an electric filter does electrically. Also, the mechanical filter tends to eliminate the mass effect from the force motion equation involved in vibrating systems. That is to say, it permits greater amplitude of vibration with the same power input to the motor.

Figure 3:
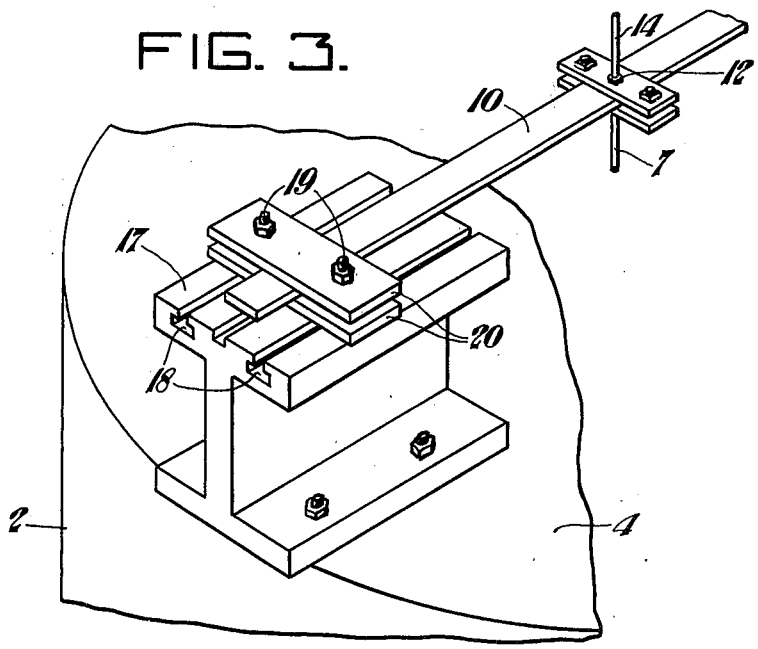
Figure 3 is a perspective view showing a modified form of supporting and adjusting means of my invention for the exciter bar.
Figure 4:
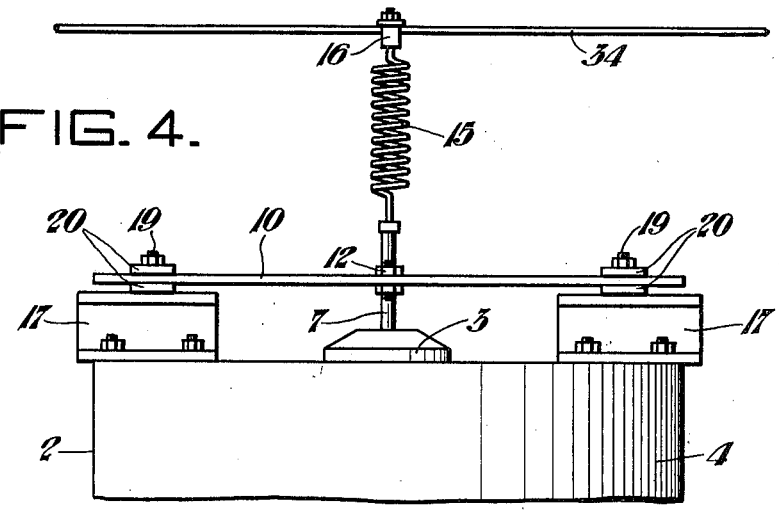
Figure 4 is an elevation of a vibration motor similar to Figure 2, showing the modified form of supporting and adjusting means incorporated therewith.

In Figures 3 and 4 of the drawings, there is shown a modification of my invention for supporting the exciter bar 10, consisting of a pair of diametrically positioned bracket supporting members 17 which are bolted or otherwise suitably secured to the frame of the motor. There is arranged in the top of the bracket supporting members 17, preferably a plurality of spaced apart T-shaped slots 18 for receiving adjustable bolts 19. On top of each of the bracket members 17, there is positioned a pair of clamping members 20 which are adapted to securely clamp and hold the ends of the exciter bar 10 therebetween. It will be noted that in this arrangement the clamping members 20 can be moved to any desired position on the bracket member and securely held in position by tightening the bolts 19, thereby eliminating the necessity of shims 8a as shown in the other embodiment of my invention. Thus, it will be seen that the clamping members 20 can be moved away from and toward each other and toward the center of the exciter bar, so as to adjust the distance between the points of support thereof in order to obtain the desired frequency of vibration of the exciter bar 10, as in the case when shims 8a are used in the embodiment heretofore described.

Obviously, the vibration motor may be connected to the conductor or to the article being tested in any one of several ways, making possible the production of alternating bending, shear or direct stresses, as the case may be.

While I have shown and described one embodiment of my invention, it will be understood that this embodiment is merely for the purpose of illustration and description, and that various other forms may be devised within the scope of my invention, as defined in the appended claims.

I claim:

1. In the testing of articles of the class described, the combination with an electrical vibration motor consisting of a drive coil arranged in the rigidly supported field of a magnet, of means for supporting said coil resiliently relative to said field, a mechanical filter bar having predetermined dimensions, means interconnecting said mechanical filter bar and the drive coil, means for supporting said mechanical filter bar adjacent each end thereof, means arranged with said mechanical filter bar supporting means for adjusting the effective distance between the points of support so as to increase or decrease the frequency of vibration thereof, and means for connecting the mechanical filter bar to the article adapted to be tested.

2. In the testing of articles of the class described, the combination with an electrical vibration motor, as defined in claim 1, wherein the means arranged with the mechanical filter bar supporting means for adjusting the effective distance between the points of support so as to increase or decrease the frequency of vibration thereof consists of a pair of adjustable shims arranged with each of said supporting means with one of said shims arranged below the mechanical filter bar at each supporting means and the other arranged above the same.

3. In the testing of articles of the class described, the combination with an electrical vibration motor, as defined in claim 1, wherein the means arranged with the mechanical filter bar supporting means for adjusting the effective distance between the points of support so as to increase or decrease the frequency of vibration thereof consists of a pair of adjustable clamping members between which the mechanical filter bar is adapted to be positioned and which are adapted to be moved toward and away from each other so as to shorten or lengthen the effective length of the mechanical filter bar.

4. In the testing of articles of the class described, the combination with an electrical vibration motor consisting of a drive coil arranged in the rigidly supported field of a magnet, of means for supporting said coil resiliently relative to said field, a mechanical filter bar having predetermined dimensions, means interconnecting said mechanical filter bar and the drive coil, means for supporting said mechanical filter bar adjacent each end thereof, means arranged with said mechanical filter bar supporting means for adjusting the effective distance between the points of support so as to increase or decrease the frequency of vibration thereof, and resilient means for connecting the mechanical filter bar to the article adapted to be tested.

5. In the testing of articles of the class described, the combination with an electrical vibration motor, as defined in claim 4, wherein the resilient means for connecting the mechanical filter bar to the article adapted to be tested consists of a coil spring.

6. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, means for rigidly supporting said mechanical filter bar adjacent the ends thereof, and means for connecting said mechanical filter bar to the article adapted to be tested.

7. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, means for rigidly supporting said mechanical filter bar adjacent the ends thereof, and resilient means for connecting said mechanical filter bar to the article adapted to be tested so as to permit operation at resonant frequencies.

8. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, means for rigidly supporting said mechanical filter bar at each side of its center and the drive rod attachment, and resilient means for connecting said mechanical filter bar to the article adapted to be tested.

9. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, means for securely supporting said mechanical filter bar adjacent the ends thereof, means for adjusting the position of said mechanical filter bar on said supporting means so that the same can be adjusted to vibrate at any desired frequency within a given range, a coil spring, means for attaching one end of said coil spring to the mechanical filter bar, and means for attaching the opposite end of said coil spring to the article adapted to be tested.

10. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, said mechanical filter bar being rigidly supported at each side of its drive rod attachment, and a coil spring having one end thereof attached to said mechanical filter bar with the other end of said coil spring adapted to be attached to the article to be tested.

11. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, a pair of diametrically positioned posts rigidly arranged on said motor with the mechanical filter bar supported thereby at each side of the center thereof and the drive rod attachment, a coil spring, means for attaching one end of said coil spring to the mechanical filter bar centrally thereof substantially opposite from the drive rod attachment, and means for attaching the opposite end of said coil spring to the article adapted to be tested.

12. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, a pair of diametrically positioned supporting members arranged on said motor with the mechanical filter bar supported thereby at each side of the center thereof and the drive rod attachment, means arranged on at least one of said supporting members so as to adjust the distance between the points of support of said mechanical filter bar whereby the frequency of vibration of said mechanical filter bar can be varied, and resilient means for connecting said mechanical filter bar to the article adapted to be tested so as to permit operation at resonant frequencies.

13. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar of predetermined dimensions to which said drive rod is securely attached, a pair of diametrically positioned posts arranged on said motor with the mechanical filter bar supported thereby at each side of the center thereof and the drive rod attachment, means arranged on each of said posts for adjusting the supported position of said mechanical filter bar thereon so that the same can be adjusted to vibrate at any desired frequency within a given range, a coil spring, means for attaching one end of said coil spring to the mechanical filter bar, and means for attaching the opposite end of said coil spring to the article adapted to be tested.

14. In the testing of articles of the class described, the combination with an electrical vibration motor, as defined in claim 13, including a disk-like member made of a non-metallic material securely arranged on said posts between the coil and the mechanical filter bar with the drive rod extending through an opening therein so as to protect the drive coil and magnetic field from foreign particles and the like.

15. In the testing of articles of the class described, the combination with an electrical vibration motor consisting of an alternating current drive coil arranged in the rigidly supported field of a direct current magnet, a drive rod, and means for attaching said coil to said drive rod, of means for supporting said coil resiliently relative to said field, a mechanical filter bar, means connecting said filter bar to said driving rod, means for supporting said filter bar adjacent each end thereof, a disk-like member made from a non-metallic material arranged on said motor above said coil, the field magnet and said filter bar and around the drive rod for protecting the same from dust and other foreign particles, and means extending through said disk-like member for connecting said drive rod to the article adapted to be tested.

DANIEL P. DYER, Jr.